United States Patent

[11] 3,601,634

[72] Inventor Michel A. Ebertin
Yorba Linda, Calif.
[21] Appl. No. 54,114
[22] Filed July 13, 1970
[45] Patented Aug. 24, 1971

[54] FIELD EFFECT TRANSISTOR MULTIPLEXING CIRCUIT FOR TIME SHARING A COMMON CONDUCTOR
5 Claims, 4 Drawing Figs.

[52] U.S. Cl. ........................................................ 307/251,
178/50, 179/15 AW, 307/205, 307/246, 307/270, 328/151, 328/172
[51] Int. Cl. ........................................................ H03k 17/60
[50] Field of Search ............................................ 307/205, 238, 241, 242, 246, 251, 264, 270; 328/103, 151, 172, 173; 178/50; 179/15 AW

[56] References Cited

UNITED STATES PATENTS 3,440,440 4/1969 Prohofsky et al. ............ 307/241 X
3,504,194 3/1970 Eastman et al. .............. 307/238
3,518,557 6/1970 Harmuth et al. .............. 307/251 X

FOREIGN PATENTS 1,169,530 11/1969 Great Britain ................ 307/251

OTHER REFERENCES

Chittenden et al., " Sampling Control for Analog Waveform Analyzer," IBM Technical Disclosure Bulletin, November 1966, pp. 602, 603, 328/151

*Primary Examiner*—Stanley T. Krawczewicz
*Attorneys*—L. Lee Humphries, H. Fredrick Hamann and Robert G. Rogers

ABSTRACT: A plurality of output drivers gated by multiple phase clocking signals are connected together at a common conductor. Sampling transistors for each of the drivers are connected to the common conductor and are gated by the same clocking signals gating the drivers for synchronizing the connections of the drivers to their associated outputs.

PATENTED AUG 24 1971 3,601,634

SHEET 1 OF 3

INVENTOR.
MICHEL A. EBERTIN

BY Robert G. Rogers

ATTORNEY

INVENTOR.
MICHEL A. EBERTIN

BY Robert G. Rogers

ATTORNEY

INVENTOR.
MICHEL A. EBERTIN
BY Robert G. Rogers
ATTORNEY

FIELD EFFECT TRANSISTOR MULTIPLEXING CIRCUIT FOR TIME SHARING A COMMON CONDUCTOR

BACKGROUND OF THE INVENTION

1. Field of the Invention

The invention relates to a field effect transistor multiplexing circuit for time sharing a common conductor and more particularly to such a circuit in which a plurality of drivers and associated sampling transistors connected to the common conductor between the driver and their associated outputs are gated by multiple phase clocking signals for enabling the time sharing of said conductor.

2. Description of Prior Art

Prior art drivers such as described and shown in Patent application Ser. No. 805,305 for a Low Power Output Buffer Circuit filed March 7, 1969 by the present inventor, each require a conductor, or lead, to connect the driver output to another circuit. The driver of the patent application is gated by multiple phase clocking signals and provides one of two voltage levels at a push-pull output as a function of the input to the driver. The output is provided during one phase of a clock signal.

It would be desirable to reduce the semiconductor chip layout area by reducing the number of conductors between the driver output and other circuits. By reducing the number of conductors, the number of pins and/or input or output pads can also be reduced.

The present invention permits the reduction of pins, conductors, input pads, and output pads by enabling the time sharing of common conductors by a plurality of drivers.

SUMMARY OF THE INVENTION

Briefly, the invention comprises a plurality of drivers gated by multiphase clocking signals for providing a driver output voltage level during one phase of a clock signal. The drivers are connected to a common conductor, or series conductors electrically connected by input/output pins or pads. A plurality of sampling transistors each associated with a particular driver and gated by the clock signal providing the output drive voltage level from the driver are connected to the common conductor between the driver and the circuit receiving the output drive voltage level.

In a preferred embodiment, a sampling transistor is turned on by the clock signal gating its corresponding driver for enabling the output drive voltage level to charge a capacitor at the output of the sampling transistor. During the sampling interval, the other sampling transistors and their corresponding drivers are held off by their respective clocking signals. As a result, a common conductor, pins, and pads can be used. The drivers are connected in multiplexed circuit arrangement.

Therefore, it is an object of this invention to provide a field effect transistor multiplexing circuit.

It is another object of this invention to provide a circuit for enabling a plurality of drivers gated by multiple phase signals to time share a common conductor between their output and other circuits.

A still further object of this invention is to provide sampling transistor between output drivers both gated by corresponding clock signals of a multiple phase clocking arrangement for enabling a common conductor to be time shared.

A further object of this invention is to provide a field effect transistor multiplexing scheme having drivers with mutually exclusive active times, for time sharing the same input/output lead and for reducing interconnections between circuit.

These and other objects of this invention will become more apparent when considered in connection with the description of the drawings, a brief description of which follows:

DESCRIPTION OF PREFERRED EMBODIMENTS

Figure 1:
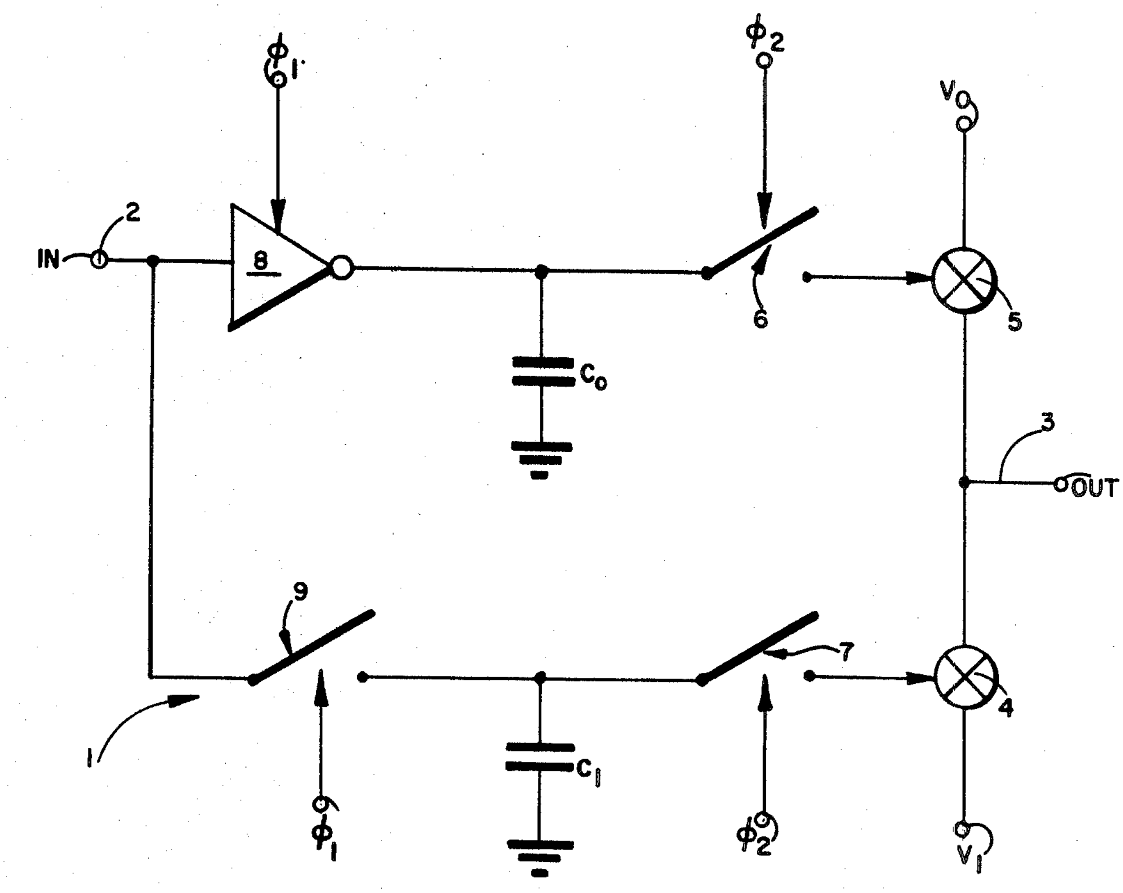
FIG. 1 is a block diagram of a driver which can be used in the multiplexing circuit described herein.

FIG. 1 is a bloc diagram of one embodiment of a driver 1 which can be used in the multiplexing circuits described herein. A more detailed schematic diagram of the driver can be seen by referring to Patent application Ser. No. 805,305, filed Mar. 7, 1969 for a Low Power Output Buffer Circuit for Multiphase Systems by the inventor of the present invention.

Driver 1 comprises an input terminal 2 and an output terminal 3 connected between switches 4 and 5 operated in a push-pull arrangement. Switch 4 is connected between output 3 and voltage level $V_1$. Switch 5 is connected between the output and voltage level $V_0$. Voltage level $V_0$ represents logic zero and voltage level $V_1$ represent logic one for the convection described herein.

Figure 4:
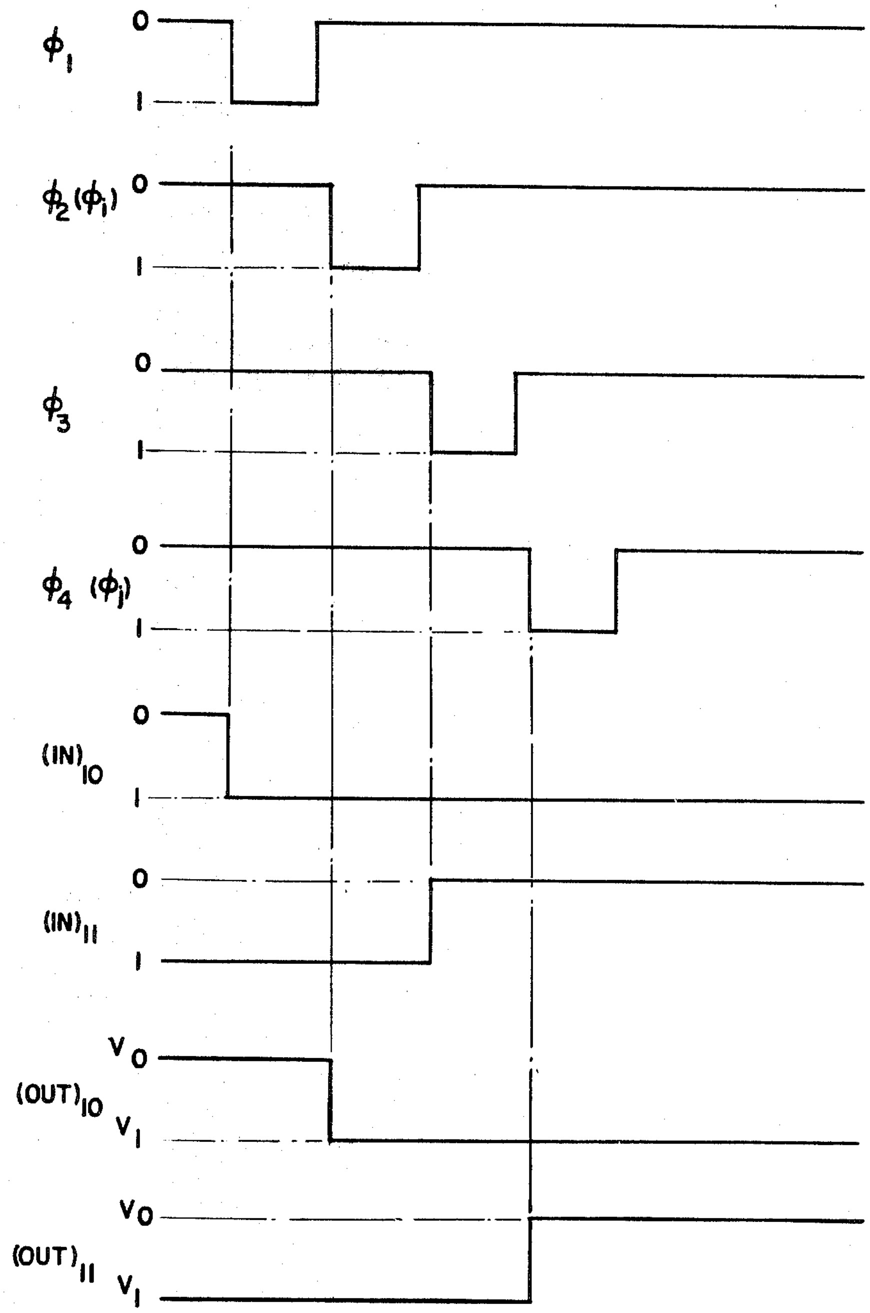
FIG. 4 is a diagram of multiple phase clocking signals which can be used in gating the FIG. 1, 2, and 3 embodiments.

Switches 4 and 5 are controlled by outputs from clocked switches 7 and 6 respectively connected in series with the input 2. When the $\Phi_2$ clock signal is true as shown in FIG. 4, the voltage across capacitors $C_1$ and $C_0$ is connected to switches 4 and 5. Since the input is inverted by inverter 8, the voltage level on capacitor $C_0$ is different from the voltage level on $C_1$. For the embodiment shown the voltage levels are assumed to be either approximately $V_1$ or $V_0$.

Therefore, if the input is true, equivalent to $V_1$, capacitor $C_1$ charges to the $V_1$ voltage level and capacitor $C_0$ charges to the $V_0$ voltage level. Where P-type field effect transistors are used to implement the switches and inverter shown for FIG. 1, the voltage levels $V_0$ and $V_1$ and the clock signal levels would be either electrical ground or a negative voltage level.

The $C_1$ capacitor charges to the input voltage level where the $\Phi_1$ clock signal is true for gating switch 9. The inverter 8 is also gated by the $\Phi_1$ clock signal, or $\Phi_1$ phase of the clock signals. Since the input is true, $C_1$ charges to a negative voltage level and during $\Phi_2$, switch 4 is turned on for providing a $V_1$ voltage level at the output 3.

If the input had been false, $C_0$ is charged negative so that during $\Phi_2$, switch 5 turns on for providing the $V_0$ voltage level at the output 3. Therefore, the output is either true or false during $\Phi_2$ as a function of the input 2.

Figure 2:
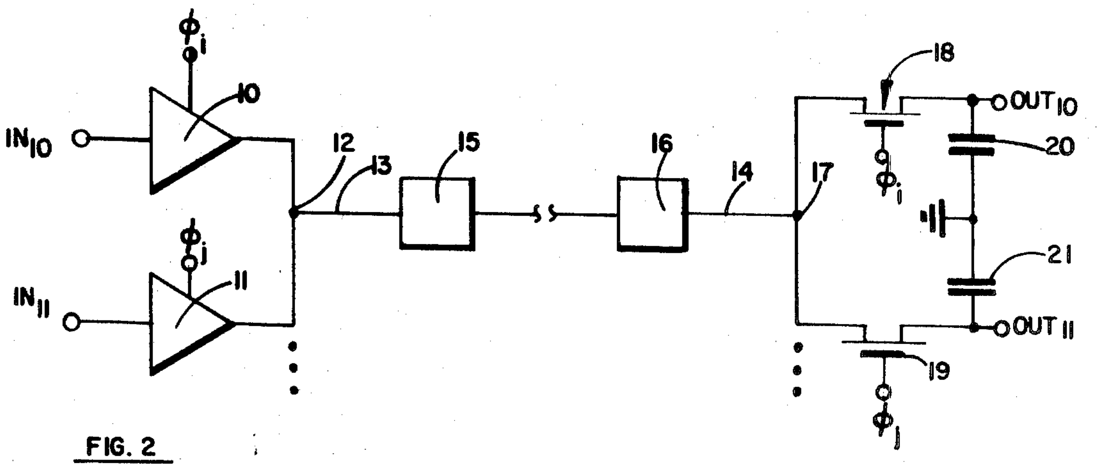
FIG. 2 is a schematic diagram of one embodiment of a field effect transistor multiplexing circuit.

FIG. 2 is a schematic diagram of one embodiment of a multiplexing arrangement showing a plurality of output drivers 10, 11, etc. Although only two drivers are shown, it should be obvious that a plurality of such drivers could be connected together at common point 12 of conductor 13. An output driver provides energy or current at an output during certain intervals.

The conductor 13 is connected in series with conductor 14 through input/output pads 15 and 16. The end of conductor 14 is connected at common point 17 between sampling field effect transistor 18, 19, etc. One sampling transistor is provided for each driver. The correspondence is determined by the clocking signals. For example, since transistor 18 is gated by a $\Phi_i$ clock signal, it corresponds to driver 10 which is also gated by a $\Phi_i$ clock signal. The $\Phi_i$ signal is equivalent to the $\Phi_2$ signal described in connection with FIG. 1.

Capacitors 20, 21, etc. are connected between the outputs of the sampling transistors 18, 19, etc. and electrical ground. For the particular embodiment shown, the capacitors represent the other circuit to which the outputs of the driver are connected.

In operation, when the input $IN_{10}$ is true during $\Phi_i$ time, as shown by FIG. 4, sampling transistor 18 is rendered conductive by $\Phi_i$ and a true output voltage, $OUT_{10}$, is provided across capacitor 20. Since $\Phi_j$ is false during the $\Phi_i$ phase, driver 11 and its associated sampling transistor 19 are held off. Therefore, if the drivers are gated by distinct phases of multiple phase clock signals and if the gated sampling transistors are connected between the drivers and the other circuits, the series conductors 13, 14 and interconnecting pads 15 and 16 can be time shared by a plurality of drivers.

During $\Phi_j$ (equivalent to $\Phi_4$) the input signal $IN_{11}$ is gated through sampling transistor 19 to output, $OUT_{11}$. If other drivers were shown, the gating sequency would continue until the operating cycle returned to the $\Phi_i$ phase. Each driver requires two phases to gate an input to a driver output as described in connection with FIG. 1.

Figure 3:
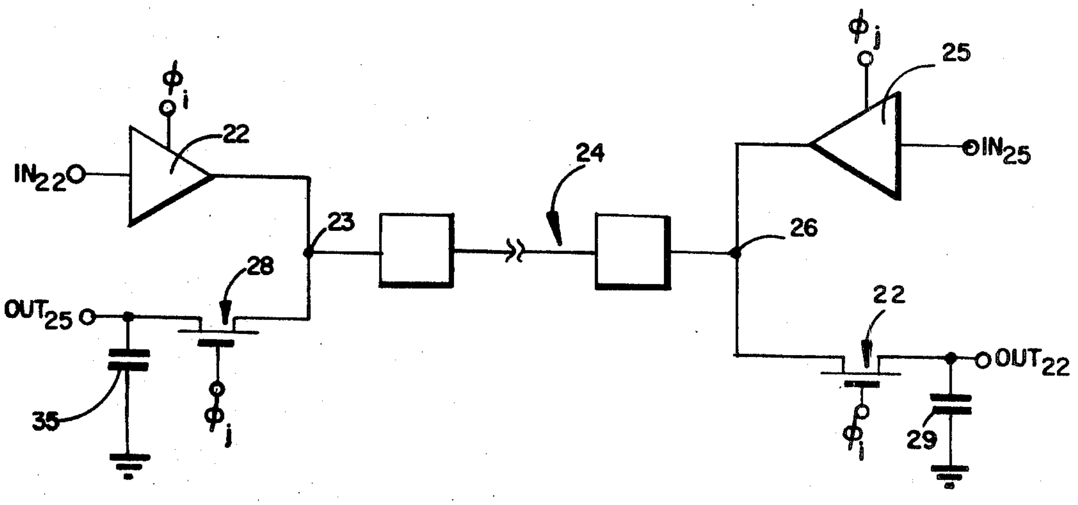
FIG. 3 is a second embodiment of a filed effect transistor multiplexing circuit.

FIG. 3 is a different embodiment of the FIG. 2 multiplexing circuit in which one driver 22 is connected at one end 23 of common conductor 24 and a different driver 28 is connected at the other end 26. The sampling field effect transistors 27, 28 and output capacitors 29 and 30 for the drivers 22 and 25 are connected at opposite ends of the common conductor 24.

The operation is substantially the same as the operation of the FIG. 2 circuit. During $\Phi_1$ the input $IN_{22}$ is gated through transistor 27 (also gated by $\Phi_i$), to output, $OUT_{22}$, across capacitor 29.

During $\Phi_j$, the input $IN_{25}$ is gated through transistor 28 to output, $OUT_{25}$, across capacitor 30. Therefore, one end of conductor 24 is connected to an input from driver 22 and an output to capacitor 30. The other end is similarly connected to both an input an an output.

The FIG. 3 embodiment provides design latitude not permitted by the FIG. 2 embodiment.

It is pointed out that N- and P-type filed effect transistors as well as complementary devices can be used in implementing the multiplexing circuit. MOS, MNOS, silicon gate and other gate controlled field effect transistors can be used within the scope of the invention.

I claim:

1. A field effect transistor multiplexing circuit gated by multiphase clocking signals comprising, a plurality of output drivers each gated by a distinct phase of said multiphase clocking signals, a common conductor, said plurality of output drivers being connected to said common conductor, a plurality of outputs each corresponding to one of said output drivers, a plurality of sampling circuits connected to said common conductor with each circuit corresponding to an output driver and gated by a corresponding phase of said multiphase clocking signals, each of said sampling circuits being connected between its associated output driver and the output for said driver.

2. The circuit recited in claim 1 wherein said plurality of output drivers are connected to a common point on said common conductor and said plurality of sampling circuits are connected at a distinct common pOint on said common conductor, said common conductor being time shared by all of said output drivers as a function of the phases of said multiphase clocking signals.

3. The circuit recited in claim 1 wherein said output drivers are alternately connected at each end of said common conductor and the sampling circuits corresponding to said alternately connected output drivers are connected at an opposite end of said common conductor.

4. The circuit recited in claim 1 wherein said sampling circuits each comprise a field effect transistor having a gate electrode connected to a clock signal, with the field effect transistors corresponding to an output driver being in electrical series with said driver and its output through said common conductor.

5. The circuit recited in claim 1 wherein said output driver provides an output voltage level only during the phase of its gating clock signal.

UNITED STATES PATENT OFFICE
CERTIFICATE OF CORRECTION

Patent No. 3,601,634 Dated August 24, 1971

Inventor(s) Michel A. Ebertin

It is certified that error appears in the above-identified patent and that said Letters Patent are hereby corrected as shown below:

On the cover sheet insert -- [73] Assignee North American Rockwell Corporation --.

Signed and sealed this 12th day of September 1972.

(SEAL)
Attest:

EDWARD M.FLETCHER,JR.
Attesting Officer

ROBERT GOTTSCHALK
Commissioner of Patents